United States Patent
Niinuma

(10) Patent No.: US 9,542,543 B2
(45) Date of Patent: Jan. 10, 2017

(54) BIOMETRIC AUTHENTICATION DEVICE, BIOMETRIC AUTHENTICATION METHOD AND COMPUTER READABLE, NON-TRANSITORY MEDIUM

(75) Inventor: Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 899 days.

(21) Appl. No.: 13/241,515

(22) Filed: Sep. 23, 2011

(65) Prior Publication Data
US 2012/0013436 A1 Jan. 19, 2012

Related U.S. Application Data

(63) Continuation of application No. PCT/JP2009/056562, filed on Mar. 30, 2009.

(51) Int. Cl.
| | |
|---|---|
| *G06F 7/04* | (2006.01) |
| *G06F 21/32* | (2013.01) |
| *G06K 9/00* | (2006.01) |
| *G06K 9/68* | (2006.01) |
| *H04L 29/06* | (2006.01) |
| *H04L 9/32* | (2006.01) |

(52) U.S. Cl.
CPC ........... *G06F 21/32* (2013.01); *G06K 9/00087* (2013.01); *G06K 9/00288* (2013.01); *G06K 9/00885* (2013.01); *G06K 9/00926* (2013.01); *G06K 9/685* (2013.01); *H04L 9/3231* (2013.01); *H04L 63/0861* (2013.01)

(58) Field of Classification Search
CPC .... G06F 21/32; H04L 63/0861; H04L 9/3231; G06K 9/00288
See application file for complete search history.

(56) References Cited

U.S. PATENT DOCUMENTS

| | | | |
|---|---|---|---|
| 6,928,181 B2 * | 8/2005 | Brooks | 382/115 |
| 2002/0034321 A1 * | 3/2002 | Saito | G06K 9/00006 382/124 |
| 2005/0270140 A1 * | 12/2005 | Oh | 340/5.83 |

(Continued)

FOREIGN PATENT DOCUMENTS

| | | |
|---|---|---|
| JP | 2003-36441 | 2/2003 |
| JP | 2005-237509 | 9/2005 |

(Continued)

OTHER PUBLICATIONS

Japanese Office Action mailed Jul. 9, 2013 in corresponding Japanese Application No. 2011-508112.

(Continued)

*Primary Examiner* — Benjamin C Lee
*Assistant Examiner* — Rajsheed Black-Childress
(74) *Attorney, Agent, or Firm* — Staas & Halsey LLP

(57) ABSTRACT

A biometric authentication device including: a data-for-matching generation portion generating a data for matching from biometric information; an update-demand determine portion determining whether a registered data registered for matching with the data for matching needs updating or not, based on a difference between biometric quality of the registered data and biometric quality of the data for matching; and a registered data replace portion replacing the registered data by a generated data for updating, according to a determination result of the update-demand determine portion.

9 Claims, 11 Drawing Sheets

(56) References Cited

U.S. PATENT DOCUMENTS

| | | | |
|---|---|---|---|
| 2007/0014440 A1* | 1/2007 | Lo | 382/124 |
| 2008/0077359 A1 | 3/2008 | Ito | |
| 2008/0212846 A1 | 9/2008 | Yamamoto et al. | |
| 2009/0254757 A1* | 10/2009 | Toyama et al. | 713/186 |

FOREIGN PATENT DOCUMENTS

| | | |
|---|---|---|
| JP | 2006-72553 | 3/2006 |
| JP | 2006-285768 | 10/2006 |
| JP | 2007-11764 | 1/2007 |
| JP | 2008-65572 | 3/2008 |
| JP | 2008-77518 | 4/2008 |
| JP | 2008-79680 | 4/2008 |
| JP | 2008-171094 | 7/2008 |

OTHER PUBLICATIONS

Full machine translation of JP 2008-65572.
Full machine translation of JP 2006-285768.
Full machine translation of JP 2005-237509.
International Search Report for PCT/JP2009/056562, mailed Jun. 2, 2009.

* cited by examiner

BIOMETRIC AUTHENTICATION DEVICE, BIOMETRIC AUTHENTICATION METHOD AND COMPUTER READABLE, NON-TRANSITORY MEDIUM

CROSS-REFERENCE TO RELATED APPLICATION

This application is a continuation application of PCT/JP2009/056562 filed Mar. 30, 2009, the contents of which are herein wholly incorporated by reference

FIELD

A certain aspect of the present invention is related to a biometric authentication device, a biometric authentication method and a storage medium.

BACKGROUND

In a person authentication, a risk of plagiarism is relatively high with use of a password authentication, an ID card authentication or the like that are widely used conventionally. And so, a biometric authentication such as a fingerprint authentication attracts attention as a person authentication having higher reliability and is being used in many situations.

In the biometric authentication, an authentication rate may be degraded because of fluctuation of biometric condition caused by chronological change from registration. This is a major cause of degradation of usability of the biometric authentication. As an example, a condition of skin changes gradually as season changes. The skin condition of many people does not change much throughout a year. Therefore, the authentication rate is not degraded throughout a year, even if a fingerprint data is registered in any season.

However, there are some people of which skin is extremely dried out in winter. In this case, the skin condition of a fingerprint data registered in summer differs largely from that of a fingerprint data registered in winter. The authentication rate may be degraded because of the difference of the skin condition. The changing of the skin condition may be changing of nick of skin, changing of skin disease, or the like in addition to the changing caused by season transition.

A method of updating registered information as necessary is supposed in order to solve the problem.

Patent Document 1 discloses a technology where time changing distribution of a similarity calculated in advance is used; it is determined that updating of registered data is needed when a predetermined condition is satisfied; and an input data for matching is registered as a new registered data.

Patent Document 2 discloses a technology where a plurality of data for matching are held at the time of matching; and a registered data is updated with use of one of data for matching held in advance.

Patent Document 1: Japanese Laid-Open Patent Publication No. 2007-11764

Patent Document 2: Japanese Laid-Open Patent Publication No. 2003-36441

SUMMARY

According to an aspect of the present invention, there is provided a biometric authentication device including: a data-for-matching generation portion generating a data for matching from biometric information; an update-demand determine portion determining whether a registered data registered for matching with the data for matching needs updating or not, based on a difference between biometric quality of the registered data and biometric quality of the data for matching; and a registered data replace portion replacing the registered data by a generated data for updating, according to a determination result of the update-demand determine portion.

According to another aspect of the present invention, there is provided a biometric authentication method including: generating a data-for-matching from biometric information; determining whether a registered data registered for matching with the data for matching needs updating or not, based on a difference between biometric quality of the registered data and biometric quality of the data for matching; and replacing the registered data by a generated data for updating according to a determination result of the determining.

According to another aspect of the present invention, there is provided a storage medium that is readable by a computer and stores a program causing a computer to act as: a data-for-matching generation portion generating a matching data from biometric information; an update-demand determine portion determining whether a registered data registered for matching with the data for matching needs updating or not, based on a difference between biometric quality of the registered data and biometric quality of the data for matching; and a registered data replace portion replacing the registered data by a generated data for updating according to a determination result of the update-demand determine portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the technology of Patent Document 1, the registered data is replaced by the data for matching at the time. It is therefore possible that the registered data is replaced by a data for matching of other user if matching error occurs at the timing of the updating of the registered data. And, in the technology, the necessity of updating of the registered data is determined with use of the similarity only. However, in general, there is no proportional relationship between chronological change and the similarity of the biometric authentication. Therefore, the registered data is not updated at an adequate timing.

In the technology of Patent Document 2, any of the registered data is replaced by the data for matching. It is therefore possible that the registered data is completely replaced by a fingerprint data of other user. It is necessary to hold all users' data for matching when the technology is adapted to a large-scale system of a few thousands or a few tens thousands of people. Therefore, a response of the whole system gets worse at the time such as morning where matching is busy, because database access is a bottle neck when all users' data are stored. And, there is a problem that a large-scale storage is needed. It is therefore difficult to adapt the technology of Patent Document 2 to a large-scale system.

A description will be given of embodiments of the invention, with reference to drawings.

Embodiment 1

Figure 1:
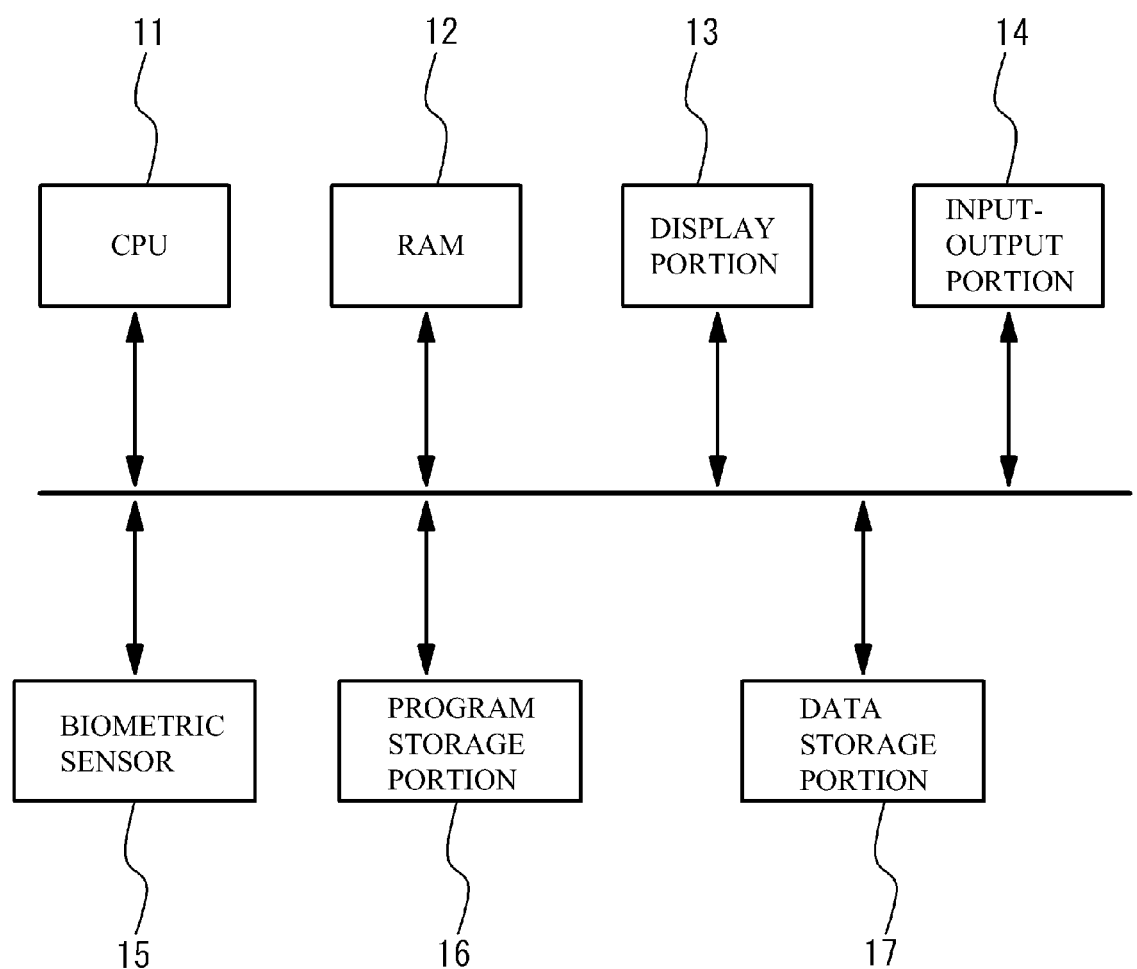
FIG. 1 illustrates a component structure of a biometric authentication device in accordance with an embodiment 1.

FIG. 1 illustrates a component structure of a biometric authentication device 100 in accordance with an embodiment 1. As illustrated in FIG. 1, the biometric authentication device 100 has a CPU (Central Processing Unit) 11, a RAM (Random Access Memory) 12, a display portion 13, an input-output portion 14, a biometric sensor 15, a program storage portion 16, a data storage portion 17 and so on. The components are coupled to each other with a bus or the like.

The biometric sensor 15 is a sensor for obtaining biometric infomration of a user such as fingerprint information or vein information. In the embodiment, a fingerprint sensor is used as the biometric sensor 15. The program storage portion 16 and the data storage portion 17 are a ROM (Read Only Memory), a hard disk or the like.

Figure 2:
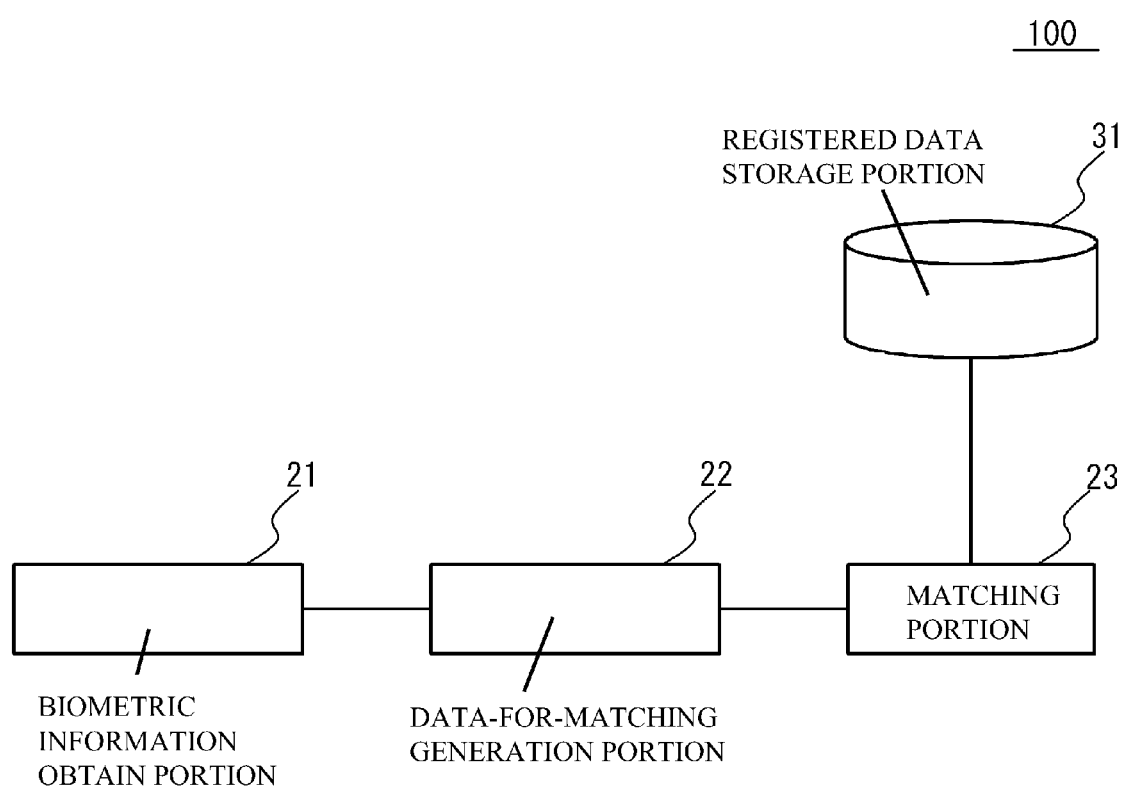
FIG. 2 illustrates a function block diagram of the biometric authentication device with respect to a biometric matching.

FIG. 2 illustrates a function block diagram of the biometric authentication device 100 with respect to biometric matching. As illustrated in FIG. 2, in the biometric matching, the biometric authentication device 100 acts as a biometric information obtain portion 21, a data-for-matching generation portion 22, a matching portion 23, and a registered data storage portion 31. The biometric information obtain portion 21, the data-for-matching generation portion 22 and the matching portion 23 operate when the CPU 11 executes a matching program stored in the program storage portion 16. The registered data storage portion 31 operates in the data storage portion 17 when the CPU 11 executes the matching program.

The biometric information obtain portion 21 obtains biometric information of a user from the biometric sensor 15. The data-for-matching generation portion 22 generates a biometric data for matching from the biometric information obtained by the biometric information obtain portion 21. The registered data storage portion 31 holds a biometric data of each user (hereinafter referred to as registered data) that is registered in advance. The matching portion 23 matches a data for matching generated by the data-for-matching generation portion 22 and a registered data of the user held by the registered data storage portion 31. The matching portion 23 determines that the matching is succeeded when a similarity between the data-for-matching and the registered data is equal to a threshold value or more, and determines that the matching is failed when the similarity between the data-for-matching and the registered data is less than the threshold value.

Depending on a user, biometric condition may fluctuate with time. Therefore, failure rate of the matching may be increased and convenience may be degraded when the registered data is not updated. And so, the biometric authentication device 100 selects a user of which registered data needs updating, and updates the registered data of the user. A description will be given of each of processes of a user selection process, a matching process, and updating process of registered template.

Figure 3:
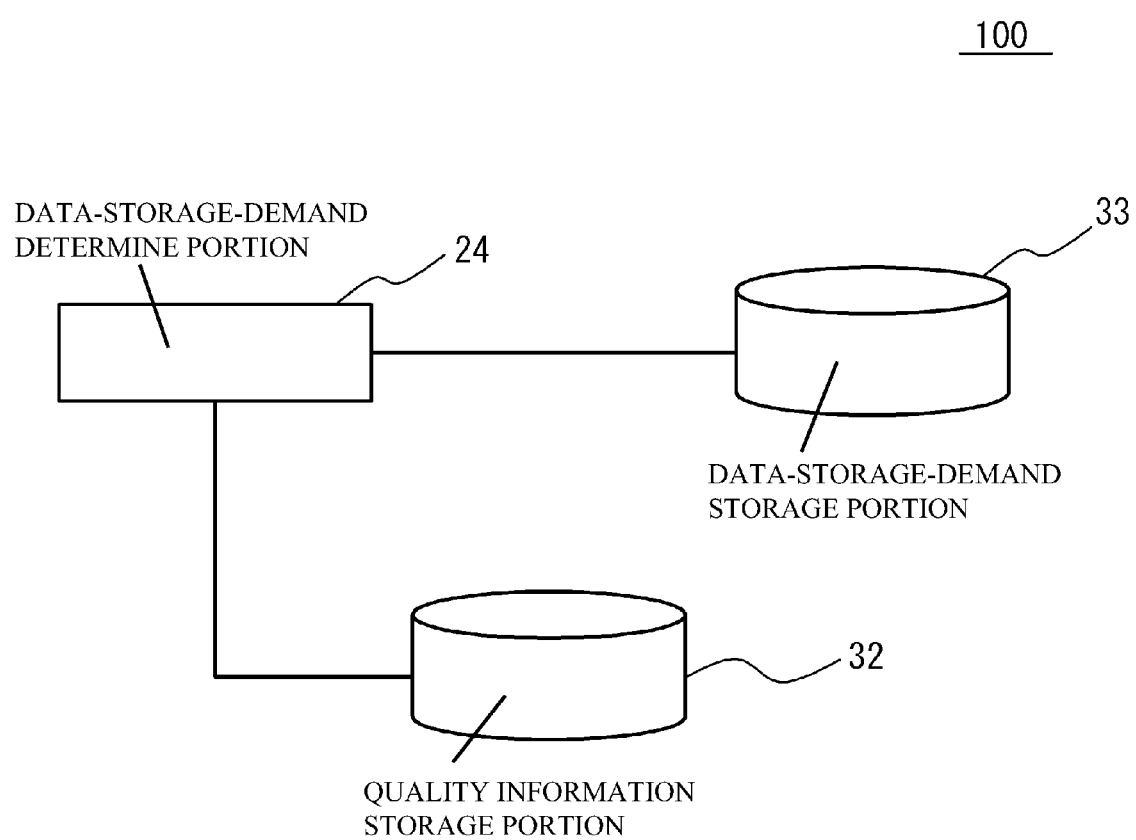
FIG. 3 illustrates a function block diagram of the biometric authentication device with respect to a user selection process.

FIG. 3 illustrates a function block diagram of the biometric authentication device 100 with respect to the user selection process. As illustrated in FIG. 3, the biometric authentication device 100 acts as a data-storage-demand determine portion 24, a quality information storage portion 32, and a data-storage-demand storage portion 33.

The data-storage-demand determine portion 24 operates when the CPU 11 executes a program for user selection process stored in the program storage portion 16. The quality information storage portion 32 and the data-storage-demand storage portion 33 operate in the data storage portion 17 when the CPU 11 executes the program for user selection process. The program for user selection process is executed at fixed intervals during a low load or the like through a batch process.

The quality information storage portion 32 stores quality of a registered data stored in the registered data storage portion 31. Here, the quality of biometric data is biometric condition (skin condition caused by dry or humidity, skin condition caused by injury or the like), similarity, matching success rate or the like. The data-storage-demand storage portion 33 relates a demand of update of a registered data stored in the registered data storage portion 31 to each user and stores the demand.

Figure 4:
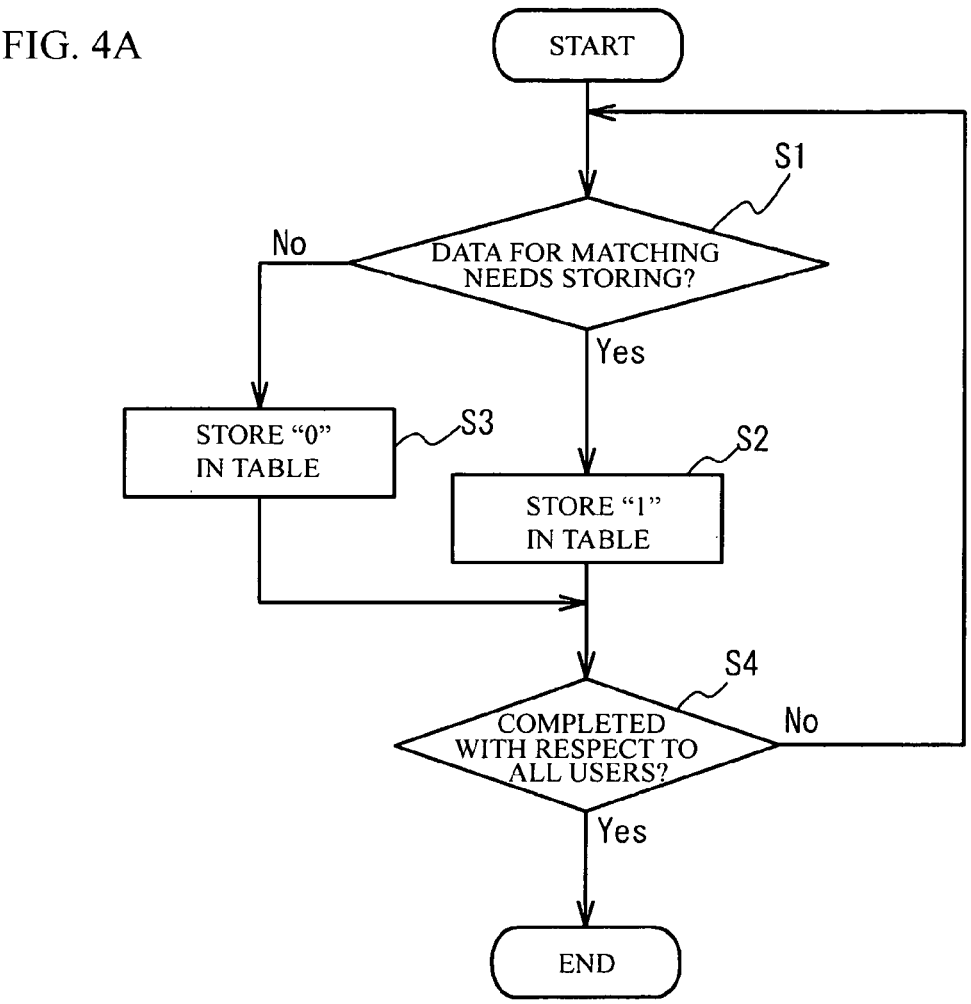
FIG. 4A and FIG. 4B illustrate an example of a flowchart executes by the biometric authentication device in the user selection process.
Figure 5:
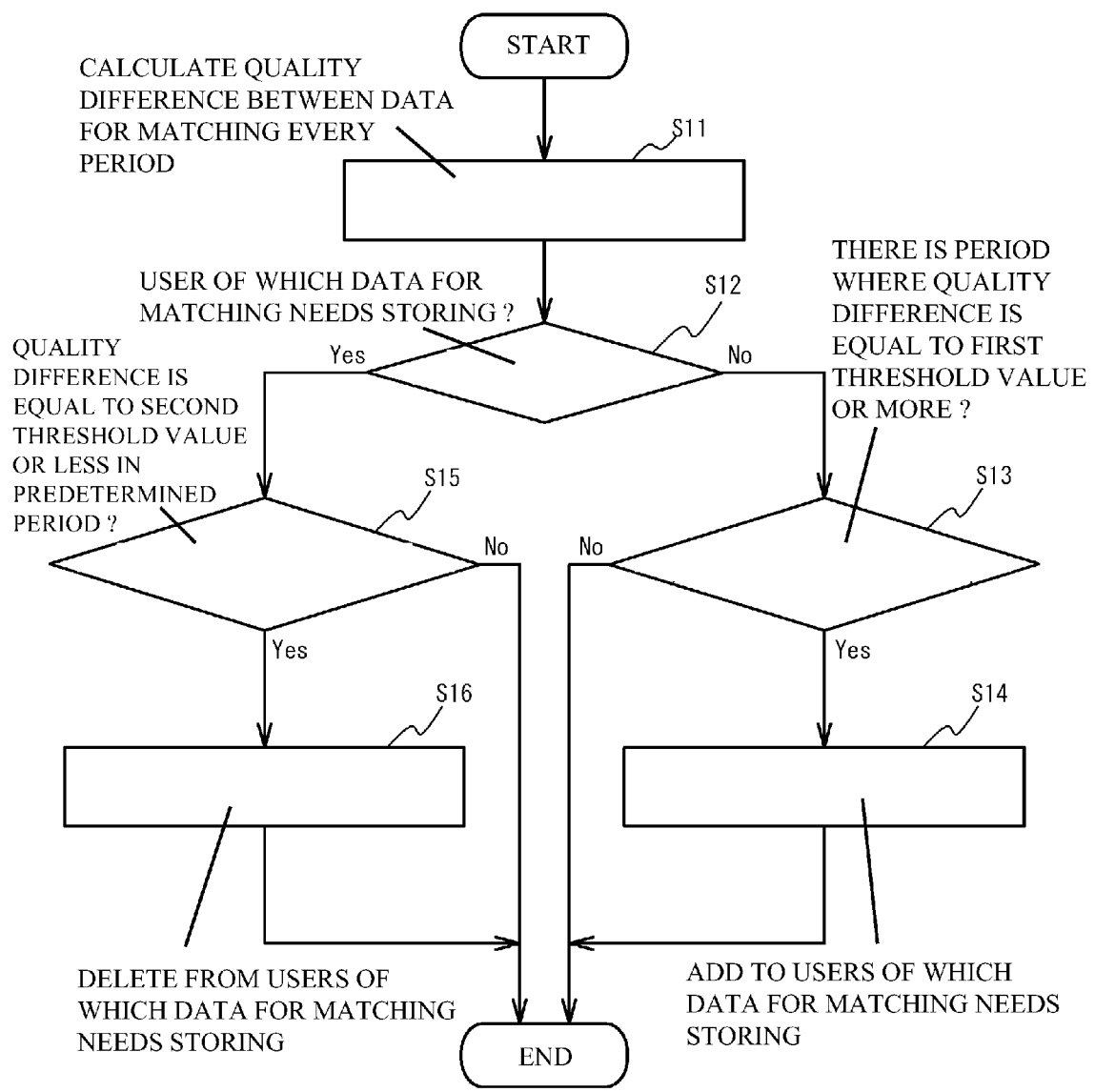
FIG. 5 illustrates an example of a flowchart executes by the biometric authentication device in the user selection process.

FIG. 4A and FIG. 5 illustrate an example of a flowchart executed by the biometric authentication device 100 at the user selection process. As illustrated in FIG. 4A, the data-storage-demand determine portion 24 determines whether storing of a data for matching is needed with respect to each user (Step S1). In the process of the Step S1, it is determined whether updating of a registered data of the user is needed or not. The details will be described later.

If it is determined that storing of a data for matching is needed in the Step S1, the data-storage-demand determine portion 24 writes the information in a table of the data-storage-demand storage portion 33 described with reference to FIG. 4B (Step S2). In the embodiment, the data-storage-demand storage portion 33 relates "1" to the user and stores "1". On the other hand, if it is not determined that storing of a data for matching is needed in the Step S1, the data-storage-demand determine portion 24 writes the information in the table of FIG. 4B (Step S3). In the embodiment, the data-storage-demand storage portion 33 relates "0" to the user and stores "0".

After execution of the Step S2 and the Step S3, the data-storage-demand determine portion 24 determines whether the step S1 is executed with respect to all users (Step S4). If it is determined that the step S1 is executed with respect to all users in the Step S4, the data-storage-demand determine portion 24 terminates the flowchart. If it is not determined that the step S1 is executed with respect to all users in the Step S4, the data-storage-demand determine portion 24 executes the Step S1 again with respect to another user. In the table of FIG. 4B, the information that storing of a data for matching is needed is written with respect to "User03"

FIG. 5 illustrates an example of a flowchart for describing details of the Step S1 of FIG. 4A. The data-storage-demand determine portion 24 calculates "difference of biometric data quality" between a plurality of data for matching based on information registered in the quality information storage portion 32 (Step S11). That is, the data-storage-demand determine portion 24 calculates a difference of quantified biometric condition, quantified similarity, quantified matching success rate or the like.

Next, the data-storage-demand determine portion 24 determines whether an objective user is a user of which data for matching needs storing on the table of FIG. 4B (Step S12). If it is not determined that the user needs storing of the data for matching in the Step S12, the data-storage-demand determine portion 24 determines whether there is a period where the above-mentioned difference is equal to a first threshold value or more in a predetermined period (Step S13).

If it is determined that there is a period where the above-mentioned difference is equal to the first threshold value or more in the Step S13, the data-storage-demand determine portion 24 relates "1" to the user and stores "1" in the table of FIG. 4B (Step S14). After that, the data-storage-demand determine portion 24 terminates the flowchart. If it is not determined that there is a period where the above-mentioned difference is equal to the first threshold value or more in the Step S13, the data-storage-demand determine portion 24 terminates the flowchart.

If it is determined that the user needs storing the data for matching in the Step S12, the data-storage-demand determine portion 24 determines whether the above-mentioned difference is equal to a second threshold value or less in a predetermined period (Step S15). If it is determined that the above-mentioned difference is equal to the second threshold value or less in the Step S15, the data-storage-demand determine portion 24 relates "0" to the user and stores "0" in the table of FIG. 4B (Step S16). After that, the data-storage-demand determine portion 24 terminates the flowchart. And, if it is determined that there is a period where the above-mentioned value is equal to the second threshold value or more in the Step S15, the data-storage-demand determine portion 24 terminates the flowchart.

In the flowchart of FIG. 5, the case where it is determined "Yes" in the Step S13 and the case where it is determined "No" in the Step S15 correspond to "Yes" of the Step S1 of FIG. 4A. And, the case where it is determined "no" in the Step S13 and the case where it is determined "Yes" in the Step S15 correspond to "No" in the Step S1 of FIG. 4A.

A maximum number or a maximum rate of users of which data for matching needs storing may be specified. In this case, the maximum numbers of users in order of low matching rate are referred to as "user of which data for matching is stored". Thus, it is possible to control the rate of stored data for matching in a whole system. It is therefore possible to obtain an effect of the updating of registered data and reduce a burden to an extent that an operation is possible in a large-scale system.

It is preferable that long-running results (for example one year) are used for determining "user of which data for matching is used" without using only recent results. Thus, it is possible to determine a user in which biometric quality does not change currently but temporarily changes in the long run as "user of which data for matching is used". It is preferable that the biometric quality is calculated separately every passed period without using an average of a long time when the result of the long time is used. It is therefore possible to determine a user in which biometric quality does not change in current three months but changed four months ago as "user of which data for matching is stored", for example.

It is preferable that a history of updating of registered data is used together with the biometric quality in the determination of "user of which data for matching is stored". It is thought that the biometric quality may change in both "automatic updating of registered data by a system" and "updating of registered data by a user". It is therefore preferable to determine "user of which data for matching is stored" with use of a frequency of the updating of registered data. An administrator or the like may edit "user of which data for matching is stored".

Figure 6:
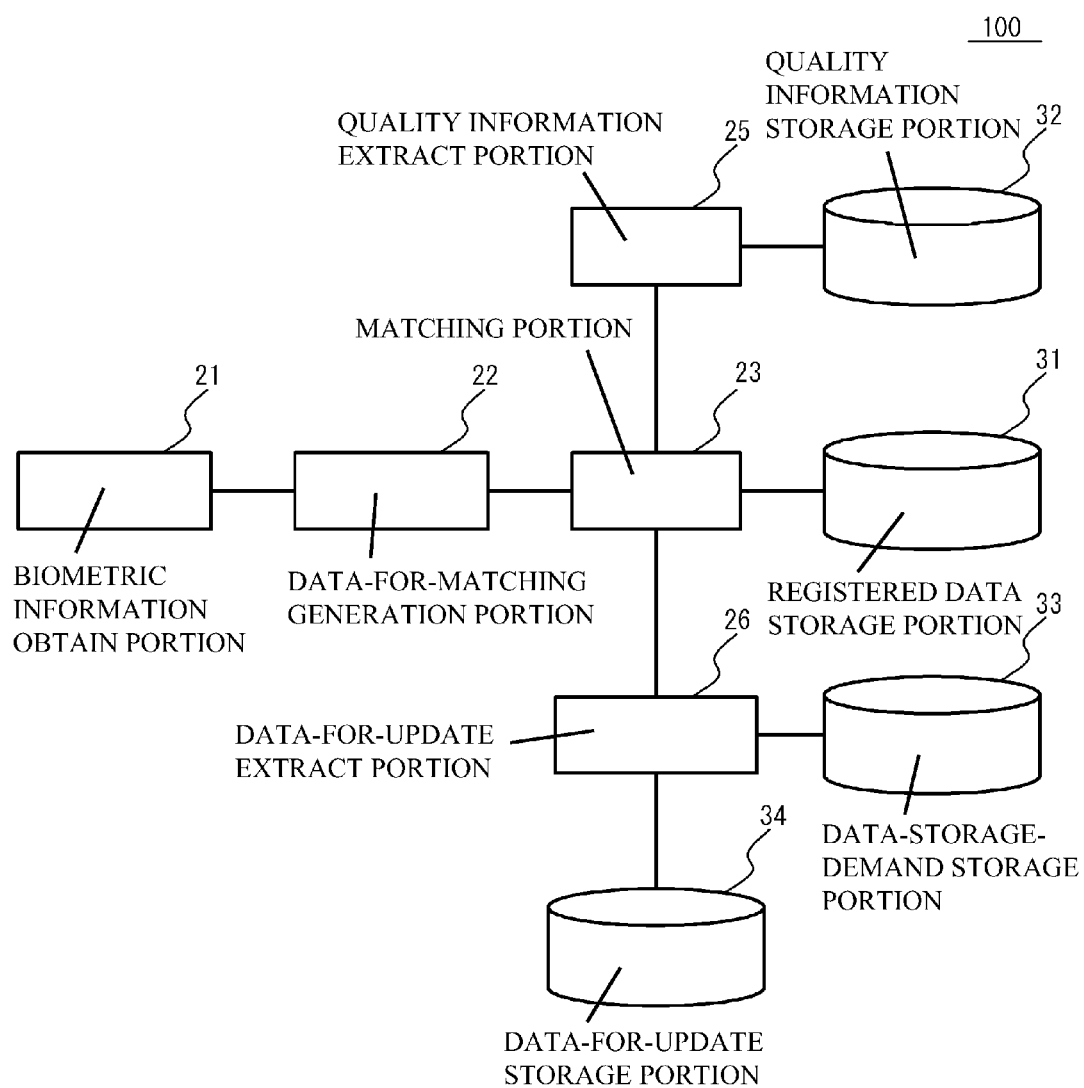
FIG. 6 illustrates a function block diagram with respect to a matching process.

Next, a description will be given of a matching process. FIG. 6 illustrates a function block diagram of the biometric authentication device 100 with respect to the matching process. As illustrated in FIG. 6, in the matching process, the biometric authentication device 100 acts as the biometric information obtain portion 21, the data-for-matching generation portion 22, the matching portion 23, a quality information extract portion 25, a data-for-update extract portion 26, the registered data storage portion 31, the quality information storage portion 32, the data-storage-demand storage portion 33 and a data-for-update storage portion 34.

The biometric information obtain portion 21, the data-for-matching generation portion 22, the matching portion 23, the quality information extract portion 25, and the data-for-update extract portion 26 operate when the CPU 11 executes the program for the matching process stored in the program storage portion 16. The registered data storage portion 31, the quality information storage portion 32, the data-storage-demand storage portion 33 and the data-for-update storage portion 34 operate in the data storage portion 17 when the CPU 11 executes the program for the matching process. The program for the matching process is executed at fixed intervals during a low load or the like through a batch process.

Figure 7:
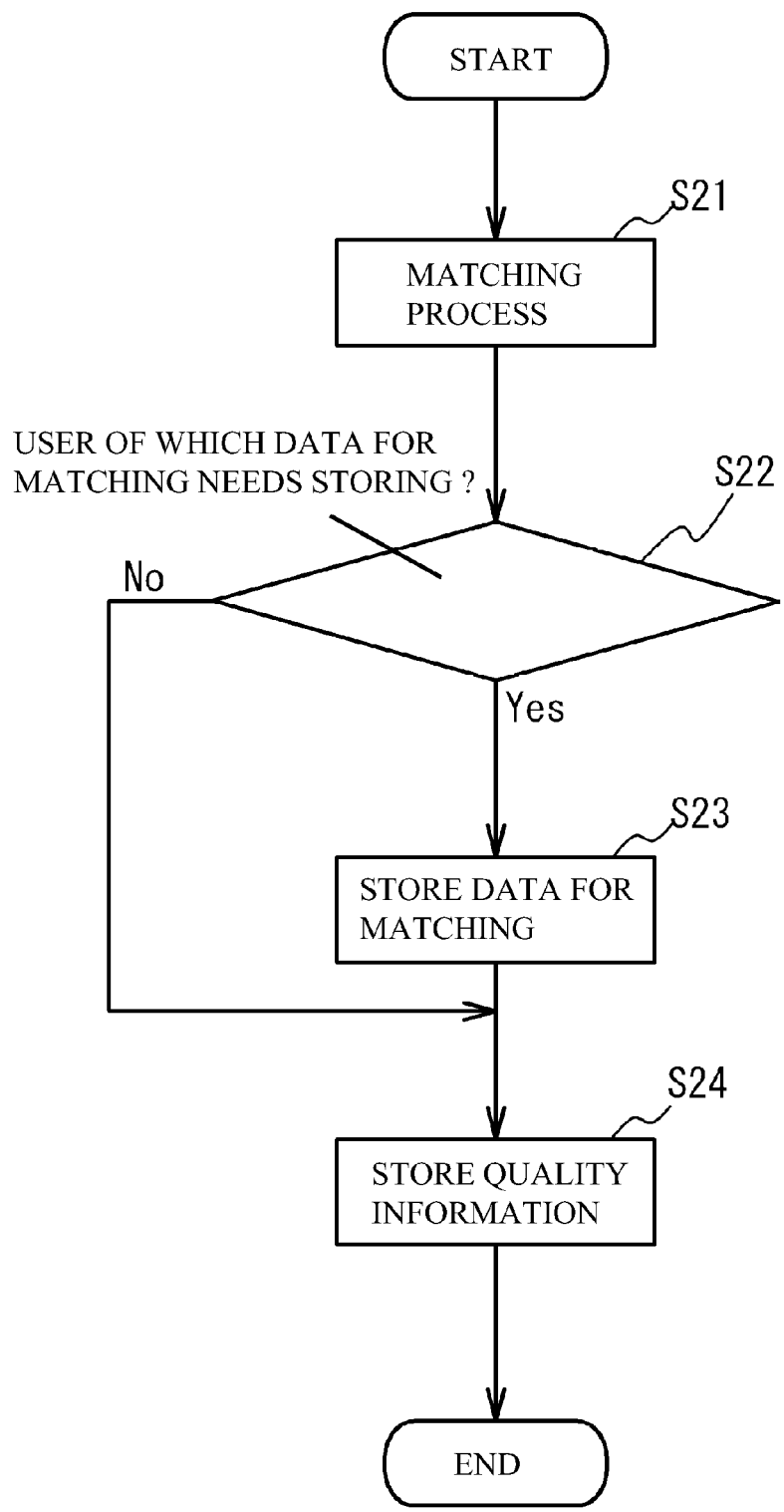
FIG. 7 illustrates an example of a flowchart executes by the biometric authentication device.

FIG. 7 illustrates an example of a flowchart executed by the biometric authentication device 100. With reference to FIG. 7, the matching portion 23 performs a matching process (Step S21). The matching process is described with reference to FIG. 2 and is omitted here. Next, the data-for-update extract portion 26 refers to the table stored in the data-storage-demand storage portion 33, and determines whether the user is a user needing storing of a data for matching (Step S22).

If it is determined that the user is a user needing storing of the data for matching in the Step S22, the matching portion 23 stores the data for matching in the data-for-update storage portion 34. After that, the quality information extract portion 25 extracts biometric quality information from the data for matching, and stores the extracted data in the quality information storage portion 32 (Step S24). After that, the biometric authentication device 100 terminates the flowchart. And, if it is not determined that the user is a user needing storing the data for matching in the Step S22, the quality information extract portion 25 executes the Step S24.

In accordance with the flowchart of FIG. 7, it is possible to largely reduce access frequency to the database together with a storage size, compared to a case where data for matching of all users are stored. Therefore, the embodiment may be adapted to a large-scale system.

A log data necessary for calculation of biometric data quality (fingerprint condition, matching result, similarity or the like) is stored with respect to all users. However, burden is small in a large-scale system because data amount of the log data is small.

It is possible to reduce a storing frequency of data by storing the matching data only in a case where a specific condition such as the following condition is satisfied, even if the user is a user needing storing of data for matching. For example, the data for matching may be stored only in a case where the biometric matching is succeeded. The data for matching may be stored when the similarity is larger than a predetermined threshold value other than the similarity used in the biometric matching.

The data for matching may be stored only in a case where a predetermined time passed after the previous storing of data for matching. The data for matching may be stored only in case where a difference of the biometric data quality is equal to a predetermined value or more between the data for matching obtained currently and the data for matching stored previously. In this case, registered data having higher reliability may be made.

Maximum number of the data for matching that can be stored with respect to the whole system or each user may be set. When the number of the data for matching needing storing is more than the maximum number, a new data for matching may be stored by deleting the oldest data in chronological order, by deleting one of data stored previously having the most similar quality to the new data, or the like.

Figure 8:
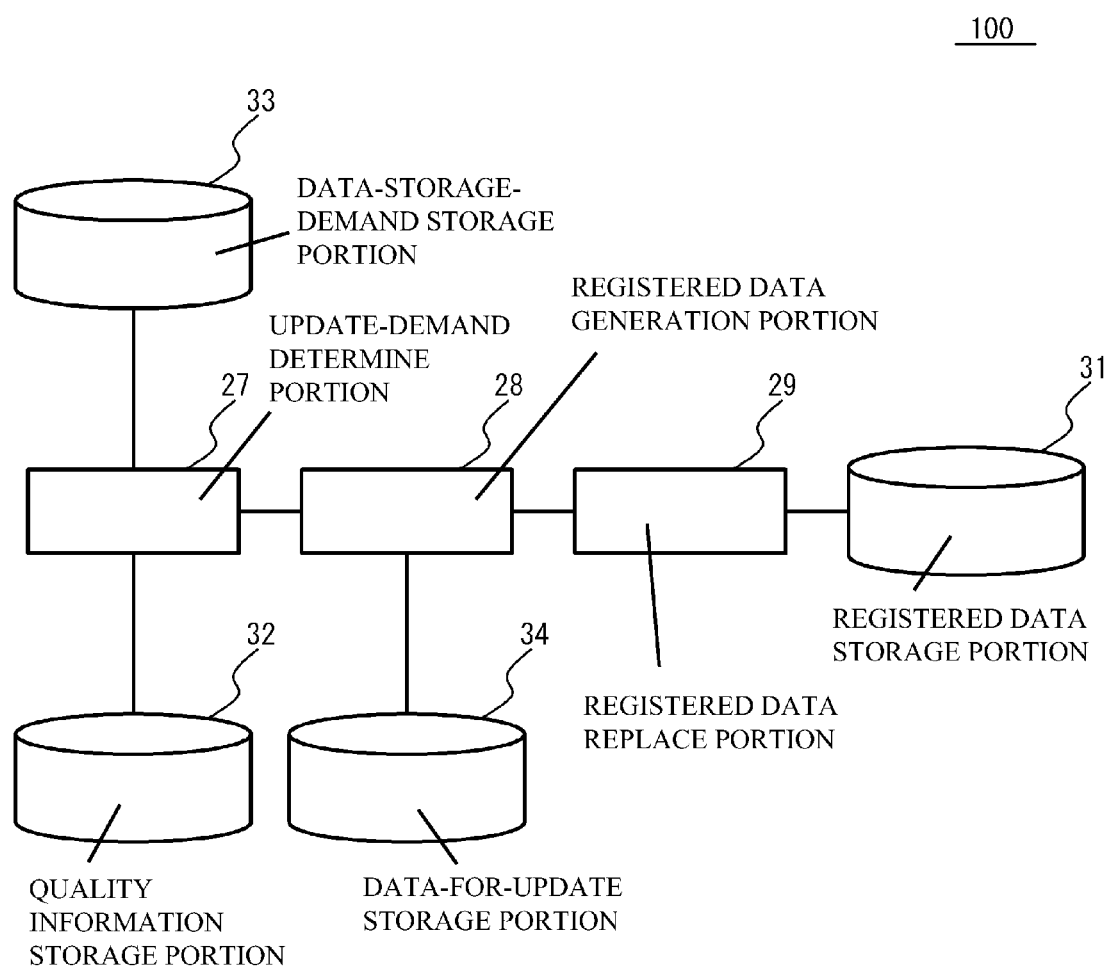
FIG. 8 illustrates a function block diagram of the biometric authentication device with respect to a updating process of a registered template.

Next, a description will be given of a process for updating a registered template. FIG. 8 illustrates a function block diagram of the biometric authentication device 100 with respect to the process for updating the registered template. As illustrated in FIG. 8, in the process for updating the registered template, the biometric authentication device 100 acts as an update-demand determine portion 27, a registered data generation portion 28, a registered data replace portion 29, the registered data storage portion 31, the quality information storage portion 32, the data-storage-demand storage portion 33, and the data-for-update storage portion 34.

The update-demand determine portion 27, the registered data generation portion 28 and the registered data replace portion 29 operate when the CPU 11 executes a program for the process for updating the registered template stored in the program storage portion 16. The registered data storage portion 31, the quality information storage portion 32, the data-storage-demand storage portion 33 and the data-for-update storage portion 34 operate in the data storage portion 17 when the CPU 11 executes the program for the process for the updating the registered template. The program for the process for the updating the registered template is executed at fixed intervals during a low load or the like through a batch process.

Figure 9:
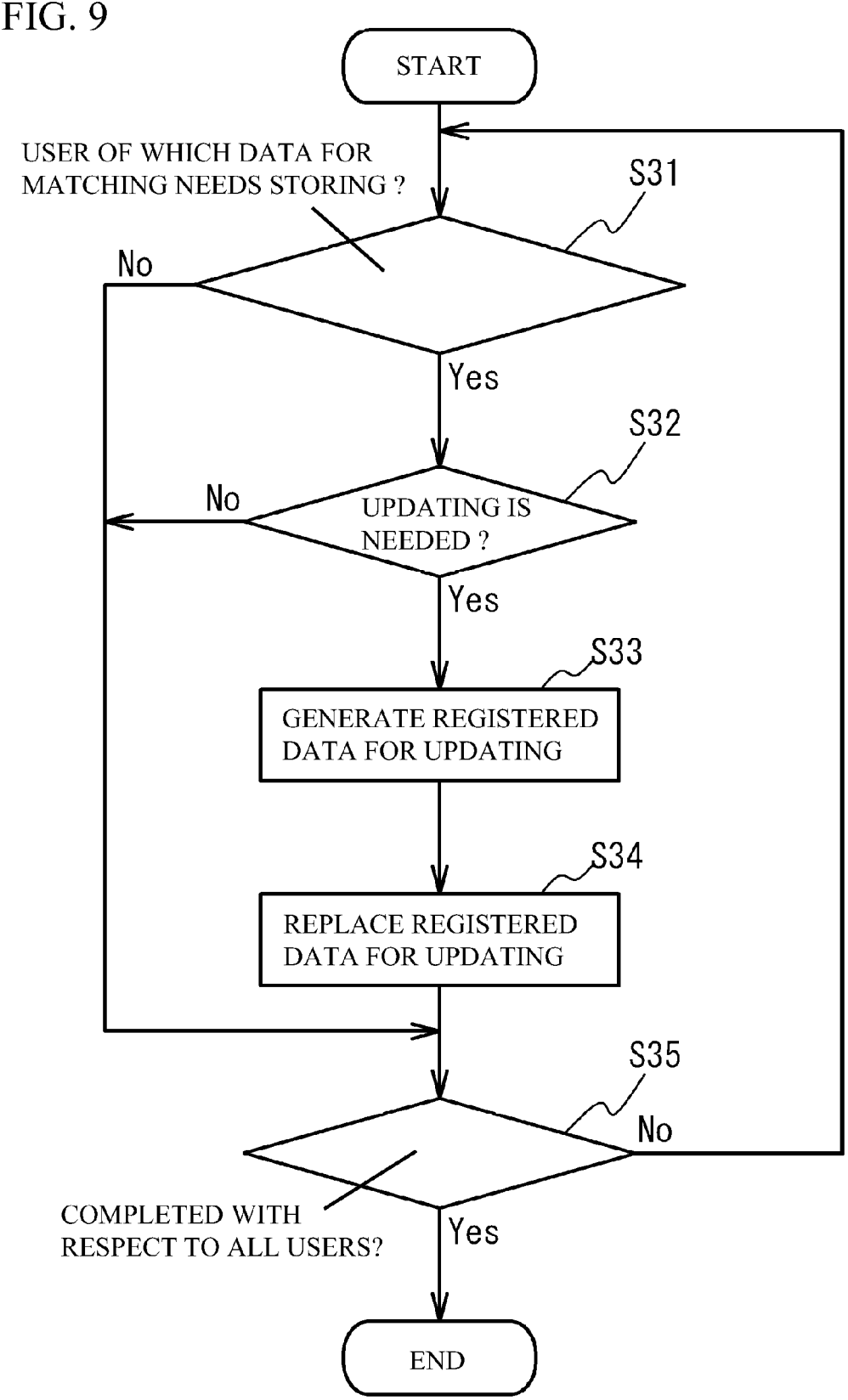
FIG. 9 illustrates an example of a flowchart executes by the biometric authentication device in the updating process of the registered template.

FIG. 9 illustrates an example of a flowchart executed by the biometric authentication device 100 in the process for updating the registered template. With reference to FIG. 9, the update-demand determine portion 27 refers to the table stored in the data-storage-demand storage portion 33, and determines whether an objective user is a user needing storing of a data for matching (Step S31). If it is determined that the objective user is a user needing storing of a data for matching, the update-demand determine portion 27 determines whether updating is needed (Step S32).

If it is determined that updating is needed in the Step S32, the registered data generation portion 28 generates a registered data for update from a data for update stored in the data-for-update storage portion 34 (Step S33). Next, the registered data replace portion 29 replaces the registered data stored in the registered data storage portion 31 by the registered data for update generated in the Step S33 (Step S34).

Next, the update-demand determine portion 27 determines whether updating of all users needing storing of data for matching is completed (Step S35). If it is not determined that the updating is not completed in the Step S35, the Step S31 is executed again with respect to another user. If it is determined that the updating is completed in the Step S35, the execution of the flowchart is terminated.

If it is not determined that the objective user is a user needing storing of data for matching in the Step S31 and if it is not determined that the updating is needed in the Step S32, the Step S35 is executed.

Figure 10:
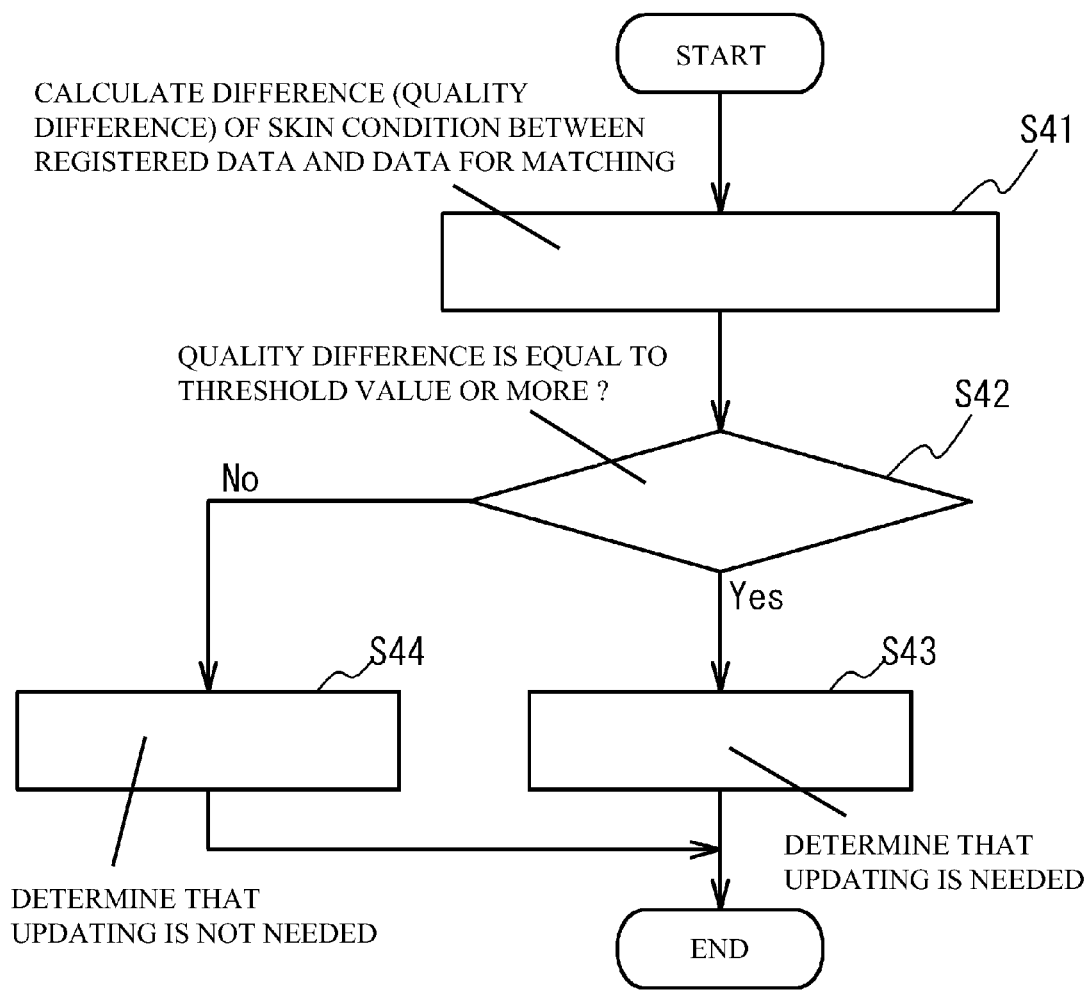
FIG. 10 illustrates a flowchart for describing details of a Step S32 of FIG. 9.

FIG. 10 illustrates a flowchart for describing the details of the Step S32 of FIG. 9. With reference to FIG. 10, the update-demand determine portion 27 calculates a biometric quality difference such as a skin condition between the registered data and the data for matching based on the quality information stored in the quality information storage portion 32 (Step S41). Next, the update-demand determine portion 27 determines whether the biometric quality difference calculated in the Step S41 is equal to a threshold value or more (Step S42).

If it is determined that the biometric quality difference is equal to the threshold value or more in the Step S42, the update-demand determine portion 27 writes the information that the registered data of the user needs updating in the data-storage-demand storage portion 33 (Step S43). After that, the execution of the flowchart is terminated. If it is not determined that the biometric quality is equal to the threshold or more in the Step S42, the update-demand determine portion 27 writes the information that the user does not needs updating in the data-storage-demand storage portion 33. After that, the flowchart is terminated.

In accordance with the flowcharts of FIG. 9 and FIG. 10, the registered data is updated with respect to only a user where the biometric quality difference appears between the registered data and the data for matching. It is therefore possible to reduce the access frequency to the database and the storage size.

In the determination of "need of updating" in the flowchart of FIG. 10, the biometric quality previously described is used. However, the determination has an object to determine a person needing updating of registered data immediately. Therefore, it is preferable to determine with use of a short-term result, being different from the determination of "user of which data for matching is used". In the "updating process of registered data", registered data has only to be made with use of only characteristics amount having high reliability in a plurality of the registered data for matching.

As mentioned above, in accordance with the embodiment, it is possible to reduce the access frequency to the database and the storage size.

Embodiment 2

Figure 11:
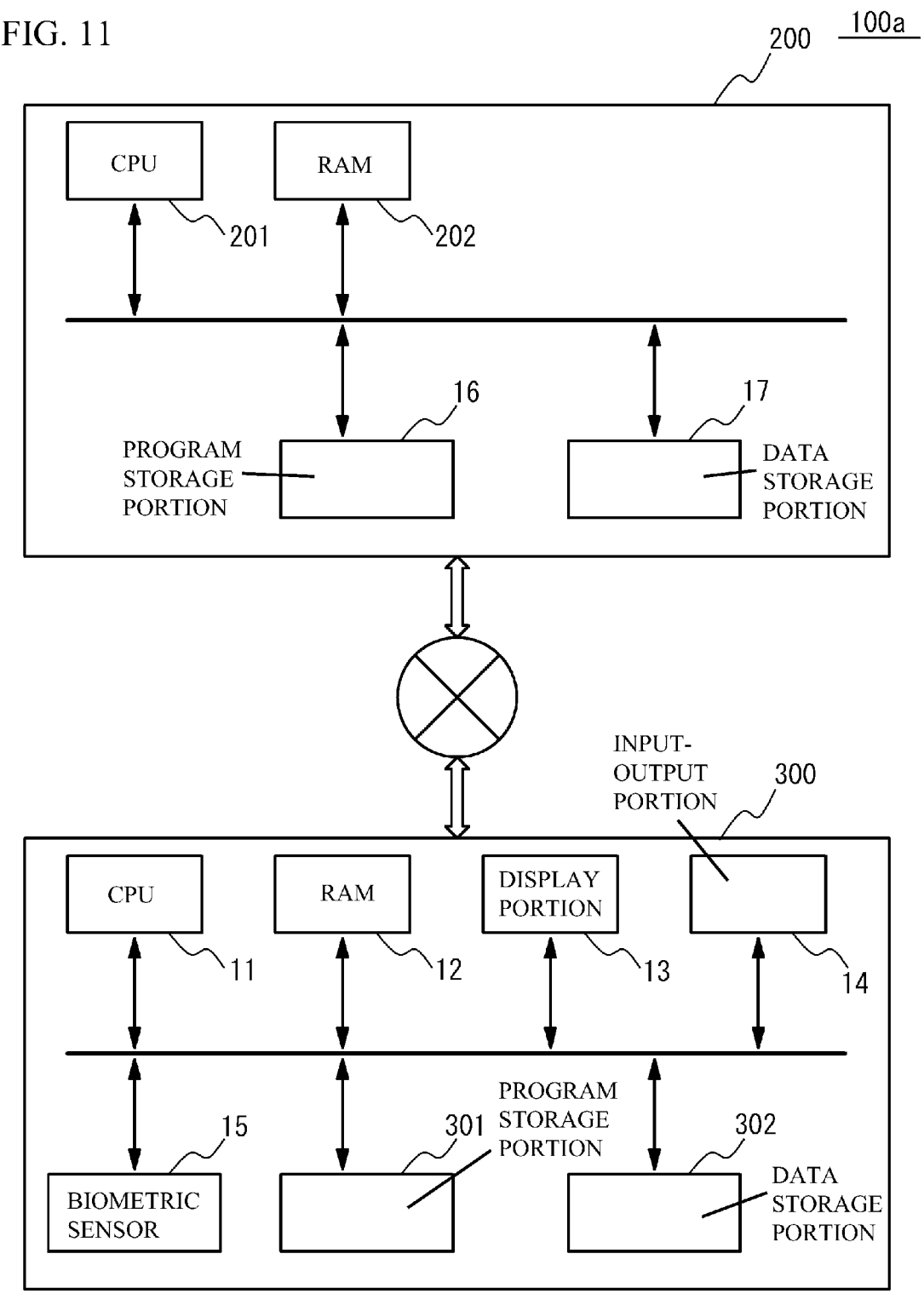
FIG. 11 illustrates a component structure of a biometric authentication device in accordance with an embodiment 2.

FIG. 11 illustrates a component structure of a biometric authentication device 100a in accordance with an embodiment 2. As illustrated in FIG. 11, the biometric authentication device 100a has a structure in which a server 200 is coupled to and may communicate with a client terminal 300 via a network. A public line network, Internet, an intranet or the like may be used as the network.

The server 200 has a CPU 201, a RAM 202, the program storage portion 16, the data storage portion 17 of FIG. 1 and so on. The client terminal 300 has the CPU 11, the RAM 12, the display portion 13, the input-output portion 14, the biometric sensor 15, a program storage portion 301, a data storage portion 302 and so on.

In the embodiment, the biometric information obtain portion 21, the data for matching generation portion 22, the matching portion 23, the data-storage-demand determine portion 24, the quality information extract portion 25, the data-for-update extract portion 26, the update-demand determine portion 27, the registered data generation portion 28 and the registered data replace portion 29 operate when the CPU 201 executes a program stored in the program storage portion 16. The biometric authentication device may be structured with a plurality of computers as in the case of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A biometric authentication device comprising:
 a storage comprising:
  a first storage region configured to store a registered biometric authentication data;
  a second storage region configured to store a data for updating the registered biometric authentication data;
  a third storage region configured to store quality information of the registered biometric authentication data and quality information of a first biometric data for matching that is generated at a first time point by a biometric sensor of a user for matching with the registered biometric authentication data for biometric authentication; and
  a fourth storage region configured to store first information that the first biometric data for matching should be stored by the second storage region or second information that the first biometric data for matching should not be stored by the second storage region, and
 a processor configured to execute a process, the process comprising:
  referring to the third storage region;
  calculating a quality difference between the quality information of the registered biometric authentication data and the quality information of the first biometric data for matching;
  changing the second information to the first information when the quality difference is equal to or more than a first threshold, the fourth storage region storing the second information;
  changing the first information to the second information when the quality difference is equal to or less than a second threshold, the fourth storage region storing the first information where the first threshold and the second threshold are different;
  performing a matching process between the registered biometric authentication data and a second biometric data for matching that is generated at a second time point, after the first time point, by the biometric sensor of the user for matching with the registered biometric authentication data for biometric authentication;
  storing the second biometric data for matching in said second storage region as the data for updating the registered biometric authentication data when the matching process is succeeded and the fourth storage region stores the first information; and
  updating the registered biometric authentication data using the data for updating the registered biometric authentication data.

2. The biometric authentication device as claimed in claim 1, wherein the process further comprises deleting a data for updating the registered biometric authentication data having quality information that is the most similar to a data for updating the registered biometric authentication data that is stored newly when a number of the data for updating the registered biometric authentication data stored in the second storage region is larger than a predetermined value.

3. The biometric authentication device as claimed in claim 1, wherein a number of the data for updating the registered biometric authentication data stored in the second storage region is a predetermined rate of all users including the user.

4. A biometric authentication method comprising:
 storing a registered biometric authentication data in a first storage region of a storage;
 storing a data for updating the registered biometric authentication data in a second storage region of the storage;
 storing quality information of the registered biometric authentication data and quality information of a first biometric data for matching that is generated at a first time point by a biometric sensor of a user for matching with the registered biometric authentication data for biometric authentication, in a third storage region of the storage;
 storing a first information that the first biometric data for matching should be stored by the second storage region or second information that the first biometric data for matching should not be stored by the second storage region, in a fourth storage region;
 referring to the third storage region;
 calculating a quality difference between the quality information of the registered biometric authentication data and the quality information of the first biometric data for matching;
 changing the second information to the first information when the quality difference is equal to or more than a first threshold and the fourth storage region stores the second information;
 changing the first information to the second information when the quality difference is equal to or less than a second threshold and the fourth storage region stores the first information where the first threshold and the second threshold are different;
 performing a matching process between the registered biometric authentication data and a second biometric data for matching that is generated at a second time point, after the first time point, by the biometric sensor of a user for matching with the registered biometric authentication data for biometric authentication;

storing the second biometric data for matching in said second storage region as the data for updating the registered biometric authentication data when the matching process is succeeded and the fourth storage region stores the first information; and updating the registered biometric authentication data using the data for updating the registered biometric authentication data.

5. The method as claimed in claim 4, further comprising:

deleting a data for updating the registered biometric authentication data having quality information that is the most similar to a data for updating the registered biometric authentication data that is stored newly when a number of the data for updating the registered biometric authentication data stored in the second storage region is larger than a predetermined value.

6. The method as claimed in claim 4, wherein a number of the data for updating the registered biometric authentication data stored in the second storage region is a predetermined rate of all users including the user.

7. A computer readable, non-transitory medium storing a program that causes a computer to execute a process, the process comprising:

storing a registered biometric authentication data in a first storage region of a storage;

storing a data for updating the registered biometric authentication data in a second storage region of the storage;

storing quality information of the registered biometric authentication data and quality information of a first biometric data for matching that is generated at a first time point, by a biometric sensor of a user for matching with the registered biometric authentication data for biometric authentication, in a third storage region of the storage;

storing a first information that the first biometric data for matching should be stored by the second storage region or second information that the first biometric data for matching should not be stored by the second storage region, in a fourth storage region;

referring to the third storage region;

calculating a quality difference between the quality information of the registered biometric authentication data and the quality information of the first biometric data for matching;

changing the second information to the first information when the quality difference is equal to or more than a first threshold and the fourth storage region stores the second information;

changing the first information to the second information when the quality difference is equal to or less than a second threshold and the fourth storage region stores the first information where the first threshold and the second threshold are different;

performing a matching process between the registered biometric authentication data and a second biometric data for matching that is generated at a second time point, after the first time point, by the biometric sensor of a user for matching with the registered biometric data for biometric authentication;

storing the second biometric data for matching in said second storage region as the data for updating the registered biometric authentication data when the matching process is succeeded and the fourth storage region stores the first information; and updating the registered biometric authentication data using the data for updating the registered biometric authentication data.

8. The medium as claimed in claim 7, wherein the process further comprises deleting a data for updating the registered biometric authentication data having quality information that is the most similar to a data for updating the registered biometric authentication data that is stored newly when a number of the data for updating the registered biometric authentication data stored in the second storage region is larger than a predetermined value.

9. The medium as claimed in claim 7, wherein a number of the data for updating the registered biometric authentication data stored in the second storage region is a predetermined rate of all users including all users.

* * * * *